(12) United States Patent
Faraj Farjow (10) Patent No.: US 12,149,412 B2
(45) Date of Patent: Nov. 19, 2024

(54) MAPPING, CHARACTERIZATION AND LOCALIZATION METHODS AND SYSTEMS FOR COMMUNICATION NETWORKS

(71) Applicant: NEURATECH COMMUNICATIONS INC., Richmond Hill (CA)

(72) Inventor: Wisam Hikmat Faraj Farjow, Richmond Hill (CA)

(73) Assignee: NEURATECH COMMUNICATIONS INC., Richmond Hill (CA)

( * ) Notice: Subject to any disclaimer, the term of this patent is extended or adjusted under 35 U.S.C. 154(b) by 0 days.

(21) Appl. No.: 18/092,234

(22) Filed: Dec. 31, 2022

(65) Prior Publication Data

US 2023/0216743 A1    Jul. 6, 2023

(30) Foreign Application Priority Data

Dec. 31, 2021   (CA) ................................. CA 3144586

(51) Int. Cl.
| | |
|---|---|
| H04W 8/00 | (2009.01) |
| H04B 3/48 | (2015.01) |
| H04B 7/12 | (2006.01) |
| H04B 10/079 | (2013.01) |
| H04L 41/12 | (2022.01) |
| H04L 43/04 | (2022.01) |
| H04W 40/24 | (2009.01) |

(52) U.S. Cl.
CPC ............ H04L 41/12 (2013.01); H04B 3/48 (2013.01); H04B 10/07955 (2013.01); H04L 43/04 (2013.01); H04W 40/246 (2013.01)

(58) Field of Classification Search
None
See application file for complete search history.

(56) References Cited

U.S. PATENT DOCUMENTS

| | | | |
|---|---|---|---|
| 10,694,336 B2 * | 6/2020 | Arunachalam | ......... H04L 67/52 |
| 2002/0061763 A1 | 5/2002 | Weissman | |
| 2011/0163887 A1 | 7/2011 | Tsujita et al. | |
| 2013/0116960 A1 * | 5/2013 | Weyn | .................. G01S 5/02521 |
| | | | 702/94 |
| 2013/0148566 A1 | 6/2013 | Doppler et al. | |
| 2021/0373553 A1 * | 12/2021 | Smith | ..................... E02F 9/265 |
| 2022/0308149 A1 * | 9/2022 | L'Heureux | ............ G01S 13/886 |

FOREIGN PATENT DOCUMENTS

WO    WO-2020087186 A1 *    5/2020    ............... H01Q 1/04

OTHER PUBLICATIONS

European Search Report for corresponding European Patent Application No. 23150014 dated Aug. 28, 2023.

* cited by examiner

*Primary Examiner* — Ajit Patel
(74) *Attorney, Agent, or Firm* — Michael D. Lazzara; Leech Tishman Fuscaldo & Lampl (57) ABSTRACT

A method of mapping and characterizing a communication network is described. Segments are mapped by having each node of the network sending and receiving messages to discover its partner until the network is fully mapped. Each segment is characterized by sample messages sent along each segment, with received signal level at each end of the segment being measured and used to calculate cable segment parameters. Location tags may have their positions estimated by using signal levels at each end of a leaky cable segment receiving the tag signal to estimate the position of location tag.

9 Claims, 7 Drawing Sheets

| Constant | Default Value | Description |
|---|---|---|
| $k(f_1)$ | -4.45 | Cable Longitudinal Loss Coefficient for Band B1 |
| $k(f_2)$ | -4.65 | Cable Longitudinal Loss Coefficient for Band B2 |
| RTR | 2.00 | R-NOD TX Rate. Measured in Sample/Sec. |
| RTT | 6.00 | R-NOD TX Timeframe. Measured in.Sec. |
| IRT | 2.00 | I-NOD RX Timeframe (IRT). Measured in,sec. |
| MP | -50.0 | Marker Power level, in dBm |
| $f_1$ | 150.00 | Band Marker Frequency (BMF), in MHz for B1 |
| $f_2$ | 174.20 | Band Marker Frequency (BMF), in MHz for B2 |
| DCC_TX | 174.50 | Duplex Communication Channels, Modem TX, MHz |
| DCC_RX | 154.50 | Duplex Communication Channels, Modem RX, MHz |
| SCC | 154.50 | Simplex Communication Channel, in MHz |

Figure 7

| | Description |
|---|---|
| RSL(b) | Average RSL Matrix for all the CRM |
| SL(b) | Segment Loss, in dB, for all values of $f_b$ |
| L | The Length of cable in the segment, in meters |
| LL(b) | The Longitudinal Loss of the cable in the segment, in dB for all value of $f_b$ |
| FL | The Flat Response Loss component in segment, in dB |

Figure 8

| | Description |
|---|---|
| RSL(n,b) | Average RSL Matrix for all the CRM carriers in the system as received by Node n. |
| SL(n,b) | Segment Loss, in dB, for all values of $f_b$ |
| L(n) | The Length of cable in segment n, in meters. |
| LL(n,b) | The Longitudinal Loss of the cable in segment n, in dB for all values of $f_b$ |
| FL(n) | The Flat Response Loss component in segment n, in dB |

Figure 9

MAPPING, CHARACTERIZATION AND LOCALIZATION METHODS AND SYSTEMS FOR COMMUNICATION NETWORKS

FIELD OF THE INVENTION

This invention relates to the field of communication systems, typically, communication systems having a cascaded systems architecture that are sometimes deployed, for example, in mines and tunnels.

BACKGROUND OF THE INVENTION

In underground environments such as mines, typical RF wireless communication systems have limited utility. One reason for this is the high attenuation ratio in such underground environments. Another related reason, not universally applicable, is that there are sometimes legal, safety-related, limitations on the power output of RF devices in mines.

Thus, typically, communication systems deployed in mines and similar environments consist of cable segments connecting nodes of the communication network, with the cable segments sometimes having passive devices on them. It will be appreciated that often, the structure of such a communication system changes over time. For example, in a mine, the system may have specific cables and branches that make up the system. However, as the mine is expanded further, more cable segments and branches of the network may be added, changing the structure of the network.

In view of this context, there is a need to be able to ascertain the structure of the communication network and the characteristics of the network segments, to facilitate proper functioning of the communication system.

Also, in mines and other similar environments, communication networks are used to detect the positions of persons or objects bearing RF tags. Known localization systems use "last known location" algorithms or zonal algorithms. These algorithms have deficiencies. For example, the perceived location of the person or object may have changed since the last location was known. Also, a zonal algorithm may determine location with insufficient precision.

SUMMARY OF THE INVENTION

In one aspect of the invention, there is provided a communication network mapping method for mapping an RF communication network having a plurality of nodes including a head end node at an upstream operational end of the network and K communication nodes downstream the head end node, K being a natural number greater than or equal to 1, each of the K nodes having associated therewith a predetermined unique identifier. The method comprises the steps of (A) executing a partner node discovery method, the partner node discovery method comprising the steps of (i) sending a broadcast message to all K nodes that a partner node discovery task is about to be executed; (ii) selecting a single initiating node from the K nodes; (iii) sending a message to the initiating node to cause the initiating node to commence the partner node discovery task; (iv) applying partner discovery communication settings to the plurality of nodes; (v) sending a partner discovery broadcast message from the initiating node over the communication network; (vi) causing one or more acknowledgment messages to be sent from one or more nodes receiving the partner discovery broadcast message, wherein each acknowledgment message identifies the node sending the acknowledgment message; (vii) receiving at the initiating node the acknowledgment message from the node immediately upstream the initiating node including the unique identifier of the node immediately upstream the initiating node; (viii) identifying the node immediately upstream the initiating node as the partner node of the initiating node; wherein the partner discovery communication settings comprise settings causing the node immediately upstream the initiating node to receive the partner discovery broadcast message and causing the initiating node to receive an acknowledgment message only from the node immediately upstream the initiating node; and (B) repeating execution of the partner node discovery method at least until each of the K nodes has been selected as the initiating node; whereby the communication network is mapped by discovering the partner node of each of the K nodes.

In an embodiment, each of the K nodes has a respective RF switch associated therewith, and wherein the partner discovery communication settings comprise the RF switch associated with the single initiating node being set to position 'A' and the respective RF switches associates with each of the other K nodes being set to position 'B'.

In an embodiment, the RF switch associated with the single initiating node is set to position 'A' after step (iii) and setting the RF switches associated with the other K nodes to position 'B' is performed before step (iii).

In an embodiment, the communication network comprises a duplex communications network having an upstream frequency and a downstream frequency, and wherein the partner discovery communication settings further comprise setting the plurality of nodes to a simplex communications channel comprising the downstream frequency.

In an embodiment, the communication network mapping method comprises the step of, prior to step (B) but after step (A), returning communication settings of the plurality of nodes to default settings.

In an embodiment, step (A) comprises the step of storing, in a memory associated with the communication network, the identity of the initiating node and its partner node.

In an embodiment, the memory stores a network mapping matrix comprising a plurality of ordered pairs, each ordered pair comprising the identifier of each node and the identifier of its partner node.

In an embodiment, in step (A), the initiating node outputs the identifier of the partner node.

In an embodiment, the head end node ceases transmitting while the partner node discovery method is executed.

In an embodiment, each of the K nodes comprises either a bi-directional amplifier, or a terminal node.

In an aspect of the invention, there is provided a method of characterizing the cable segments of an RF communication network having a plurality of nodes including a head end node at an upstream operational end of the network and K communication nodes downstream the head end node, K being a natural number greater than or equal to 1, wherein each segment comprises a cable segment with a first node at a first end thereof and a second node at a second end thereof without any nodes between the first and second nodes, the method comprising the steps of, for each segment: (A) sending a sample message along the segment from the first node to the second node, the message having a predetermined transmitted signal power level; (B) receiving the sample message at the second node; (C) measuring the received signal power level of the sample message as received at the second node; (D) determining a cable segment power loss by comparing the transmitted signal power level and the received signal power level; and (E) using the cable segment power loss, and at least one predetermined cable segment parameter, calculating one or more of a length of the segment, a flat response loss of the cable segment, and a longitudinal loss of the segment.

In an embodiment, the first node is upstream from said second node, and the characterizing method comprises the step of, prior to step (A), setting the first node and second node to simplex communication, setting a first node RF switch to position B, and, setting a second node RF switch to position A unless said second node RF switch is already set to position A.

In an embodiment, the sample message comprises a plurality of characterization reference markers, and the received signal power level of the sample message comprises an average received signal power level of the characterization reference markers.

In an embodiment, the network comprises N operating frequencies associated with the cable segment, N being a natural number greater than zero, and the sample message comprises N pluralities of characterization reference markers, each of the N pluralities corresponding to a single one of the N frequencies.

In an embodiment, step (A) comprises sending each plurality of characterization reference markers for a transmission timeframe, and step (B) comprises receiving at each of the N frequencies for a receiving timeframe, the transmission timeframe being more than twice as long as the receiving timeframe.

In an embodiment, step (D) comprises determining the cable segment power loss for each of the N frequencies.

In an embodiment, calculating a longitudinal loss in step (E) comprises calculating the longitudinal loss associated with each of the N frequencies.

In an embodiment, the at least predetermined cable segment parameter includes a first frequency longitudinal loss coefficient and a second frequency longitudinal loss coefficient.

In an aspect of the invention, there is provided a method of estimating a location of a location tag using a network, the network comprising a plurality of leaky cable segments, each segment having a first node at a first segment end and a second node at a second segment end, the, the method comprising the steps of: (A) receiving a tag signal from the tag on a particular leaky cable segment; (B) after the tag signal travels to the first node and second node of the particular leaky cable segment, measuring the received first node tag signal level and the received second node tag signal level; (C) using a previously known length of the particular leaky cable segment, the received first node tag signal level and the received second node tag signal level, determining a point on the particular leaky cable segment at which the tag signal was received; (D) using a previously known location of the particular leaky cable segment, determining a location of the point on the particular leaky cable segment at which the tag signal was received; whereby the position of the tag can be estimated.

In an embodiment, step (C) comprises determining a first distance of the point from the first node. In an embodiment, the method further comprises determining a second distance of the point from the second node. In an embodiment, the first distance is determined by multiplying the length by a scaling normalization factor. In an embodiment, the scaling normalization factor is determined according to the following formula:

$$F = \text{ABS}\left[\frac{0.50(\Delta - \Delta_{max})}{-\Delta_{max}}\right]$$

where F is the scaling normalization factor; $\Delta$ is an instantaneous difference between the received first node tag signal level and the received second node tag signal level; $\Delta_{max}$ is a maximum received signal level difference expected for the particular leaky cable segment; and $\Delta_{min}$ is a minimum received signal level difference expected for the particular leaky cable segment. In an embodiment, the method comprises determining a second distance of the point from the second node by subtracting the first distance from the length.

In an aspect of the invention, there is provided a use of at least one leaky cable segment, in a method of estimating a location of a location tag, for receiving location signals from the location tag. In an embodiment, the use further comprises the use of the leaky cable in estimating a position of the location tag relative to at least one communication node of a communication network. In an embodiment, the use comprises use of a previously-known length of the leaky cable segment as a reference element in estimating the distance of and location of a location tag.

BRIEF DESCRIPTION OF THE DRAWINGS

Reference will now be made, by way of example only, to the figures which illustrate the preferred embodiment of the invention, and in which.

DETAILED DESCRIPTION OF THE PREFERRED EMBODIMENTS

This invention will be described with reference to leaky cable communication networks (also known as leaky feeder or radiating cable) commonly used within mines and other underground similar environments. However, it will be appreciated that the invention can be used with other communication systems where applicable. It will further be appreciated that the invention might be applied to a variety of system architectures, including fiber-based and cascaded amplifier systems.

Figure 1:
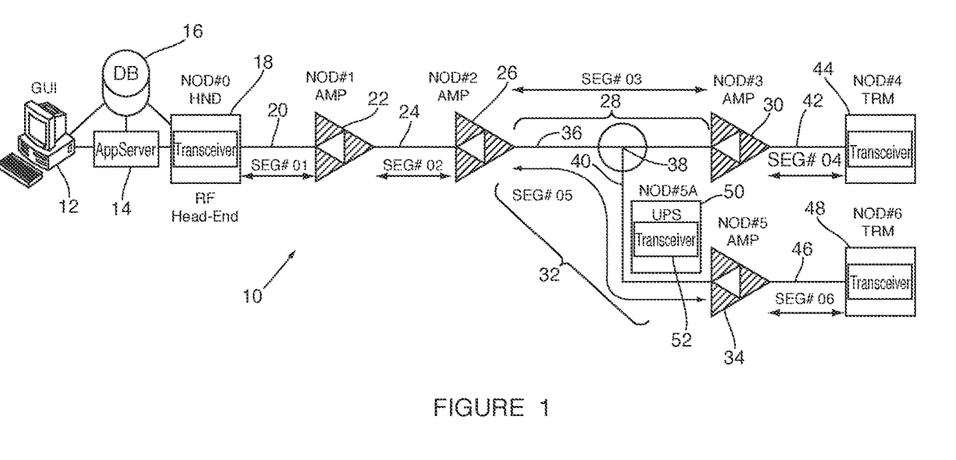
FIG. 1 is a schematic diagram of an example communication network.

Referring now to FIG. 1, a block diagram of an example communication network 10 is shown. The network 10 may have at least two operating frequency bands. The example system 10 comprises a Graphical User Interface (GUI) 12 facilitating user interaction with electronic devices in network 10. In the preferred embodiment, the GUI is Microsoft® Windows®-based, but it will be appreciated that other configurations are comprehended by the invention.

Operatively connected to the GUI 12 is application server 14. Server 14 hosts an operating system that operates and controls the activities of the data acquisition and operational routines of the system 10. In the preferred embodiment, the application server is a Linux®-based platform, but it will be appreciated that other application server configurations are comprehended by the invention.

The database 16 comprises, inter alia, an organized collection of data acquired by the operating system. Database 16 is preferably based on an SQL platform and housed in application server 14, though other configurations are comprehended.

Operatively connected to the application server 14, operating system and database is a head end node or root node 18. In this example network 10, the head end node functions as the main modem unit for system 10. It transmits signals to and receives signals from the downstream components of the network 10.

Cable segment 20 connects head end node 18 with bi-directional amplifier (BDA) 22. Cable segment 24 connects BDAs 22 and 26. Cable segment 28 connects BDAs 26 and 30. Cable segment 32 connects BDAs 26 and 34. As can be seen in FIG. 1, cable segments 28 and 32 share a cable portion 36, which connects BDA 26 with branch unit 38. Branch unit 38 provides a cable segment branch 40 to BDA 34. Thus, BDA 26 is the communication node immediately upstream both BDA 30 and BDA 34. It will be appreciated that cable segments comprehended by the invention might comprise passive components such as branch units (for creating network branches) and splice units (for joining cable sections in the network).

In relation to the example system 10 in FIG. 1, "upstream" means toward or closer to head end node 22, while "downstream" means away from or further from the head end node 22.

Referring still to FIG. 1, cable segment 42 connects BDA 30 to terminal node 44. Cable segment 46 connects BDA 34 to terminal node 48. It will be appreciated the example network 10 has two distinct branches, and thus, two terminal nodes. The invention comprehends network designs with fewer than two terminal nodes, or more than two, according to the specific configuration of the communication network. In this example network 10, the terminal nodes function to provide impedance matching at the end of each line of the communication network. Further, as described below, the terminal nodes are used in the characterization of network segments. Thus, the terminal nodes and the BDAs comprise communication nodes for the purpose of the network mapping method described below.

Those skilled in the art will appreciate that a leaky cable system operates by transmission of signals, typically RF signals, along the cables via the BDAs.

Network 10 further comprises an uninterruptible power supply (UPS) 50. In the preferred embodiment, the UPS node 50 is operatively connected to, and provides DC power to, all of the active nodes of network 10. The UPS 50 is communicatively connected to the application server 14 and the operating system. The UPS 50 includes transceiver 52, through which the operating system can access the UPS to request and receive diagnostics information from the UPS 50. In the example system 10, it is not a communication node.

In the preferred embodiment, each of the devices in network 10 will be assigned a unique identifier stored in memory associated with the network 10, to be used by the operating system to identify each device in the network. Also, preferably, each type of node has a unique type number stored in memory associated with the network 10, to be used by the operating system to identify each device type in the network. For example, the head end node (HND NODE) may be type 0 (and its unique identifier may be 0 as well). BDAs (BDA NODE) may have type 1. Terminal nodes (TRM NODE) may be type 2. UPS node(s) (UPS NODE), which are not communication nodes, may have type 3. It will be appreciated that other modes of network device identification are comprehended by the invention.

Figure 7:
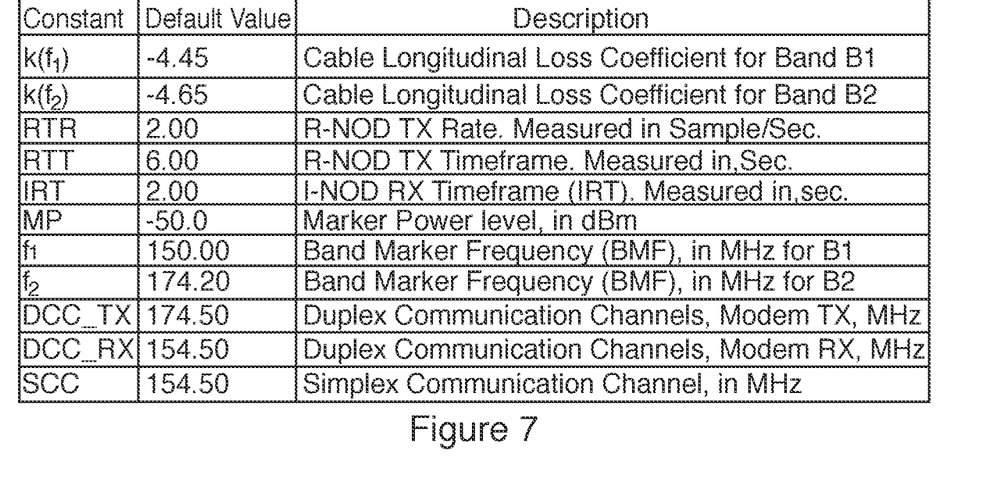
FIG. 7 shows an example constants table.

Preferably, there is a constants table (CT) stored in memory associated with the operating system which contains the various constants required for one or more of the methods disclosed in this application. Thus, for example, parameters for the cable segments (such as cable longitudinal loss coefficient are preferably stored in the CT. It will be appreciated that the word "table" is not intended to connote any particular data structure. Rather, the CT may comprise any storing of relevant constants for the execution of one or more methods described herein. An example CT is shown at FIG. 7.

Other parameters may be contained within the stored CT. These include the number of bands in the network ("B"); the band reference number ("b"—wherein b is in the set {1, 2, 3 . . . B}); the frequency, in megahertz, of the reference marker of band b ("$f_b$"); and the marker power level in dBm ("MP"). Preferably, all reference markers (described further below) will have the same power level.

The methods will be described with reference to a network having RF traffic flowing in two directions, upstream and downstream. In this example network:

B=2
$f_1$=150.00 MHz
$f_2$=174.80 MHz
MP=−50.00 dBm

Figure 2:
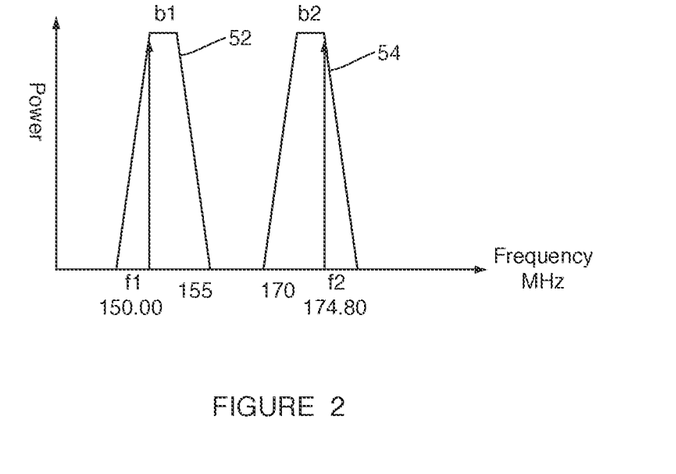
FIG. 2 is a graph illustrating parameters of an example communication network.

A graphical representation of the two-band communication system 10 is shown at FIG. 2. Bands b1 (reference numeral 52) and b2 (reference numeral 54) have reference frequencies 150 MHz and 174.8 MHz respectively.

Mapping Method

The invention comprehends a communication network mapping method for mapping an RF communication network 10 having a plurality of nodes. The nodes include a head end node 18 at the upstream operational end of the network 10 and at least one node downstream the head end node 18 ("downstream nodes"). The example network 10 shown in FIG. 1 has six communication nodes downstream the head end node but it will be appreciated that there may be K nodes downstream the head end node, where K is a natural number greater than or equal to 1. As mentioned above, each of downstream nodes has a predetermined unique identifier associated with it.

It will be appreciated by those skilled in the art that RF switches (such as those in the communication nodes of the present network) typically have an A position and a B position. In the present example network 10, the default setting of the communication nodes is A. The preferred mapping method seeks to identify, in respect of each downstream communication node, the partner node that connects to that downstream node's "A" port. The operating system preferably controls the times of the execution of this method by means of a polling cycle schedule, and each downstream node seeks to discover its partner during its designated time slot. In the preferred version of the method, it is executed sequentially so that a node identifies its partner, then the next node does so, and then the next one, etc., until all of the downstream nodes have done so. The node whose partner is being sought will be referred to as the initiating node. In the preferred embodiment, the partner node is the node immediately upstream the initiating node, at the other end of the cable segment that is immediately upstream the initiating node. Thus, these two nodes are immediately communicatively adjacent to one another.

In the preferred embodiment, a partner node discovery method is executed repeatedly—until each of the K nodes (K=6 in this example) has been selected and used as the initiating node. In the preferred partner node discovery method, the operating system causes a broadcast message to be sent to all of the K nodes that a partner node discovery task is about to be executed.

In the example network 10, by default, the RF switches in the K nodes are configured to be in position 'A'. The K nodes are each configured to change the position of their RF switches to 'B' in response to the broadcast message.

Then, the operating system selects one of the K nodes as the initiating node. In the example described here, the initiating node is BDA 26, and the goal is to discover the partner node of BDA 26 at the other end of cable segment 24 (also called "receiving node"). The operating system causes a message to be sent to the selected initiating node to cause the initiating node to commence the partner node discovery task. Once that partner node discovery message is received by the initiating node, the initiating node's RF switch is set to position 'A', while the RF switches of the other nodes remain at position 'B'.

In executing the partner node discovery method, the operating system causes partner discovery communication settings (PDCS) to be applied the nodes. The partner discovery communication settings preferably comprise setting the RF switches of the K nodes to 'B' as described above, and the initiating node's RF switch to 'A' as described above.

Then, as part of applying the PDCS, the modem of the initiating node preferably changes its communication channel from the Duplex Communication Channels (DCC) to the Simplex Communications Channel (SCC). This change also preferably is included in the partner discovery communication settings. The DCC has an upstream frequency (frequency of communications travelling upstream) and a downstream frequency (communications travelling downstream). The communication channels are preferably defined in the constants table. The SCC is a simplex channel with TX (transmit) and RX (receive) frequency assignments set to that of the RX (downstream) frequency of the DCC. Thus, in the present example, the frequency plan for the initiating node's modem is:

CH 1: DCC Modem TX Frequency (DCC_TX)=174.50 MHz and RX Frequency (DCC_RX)=154.50 MHz
CH 2: SCC Modem TX/RX Frequency (SCC)=154.50 MHz Next, the modem of head end node 18 will stop transmitting until the initiating node completes the mapping of its segment i.e. its partner node discovery task. The modem of head end node 18 will wait for the initiating node to report the end of the partner node discovery task.

In this example iteration of the partner node discovery method, the initiating node is node 26. Node 26 includes RF switch 56, which, as described above, has been set to position 'A'. The RF switches 58, 60 and 62 of nodes 22, 30 and 34 remain at position 'B'. Also, as described above, when the partner node discovery task is about to be performed, head end modem 63 stops transmitting.

Figure 3:
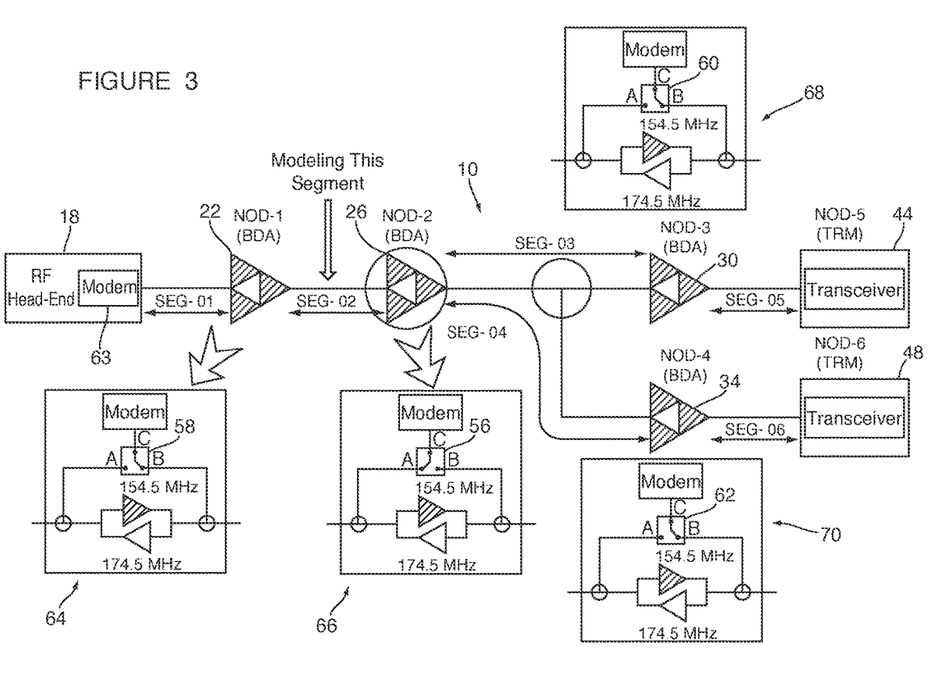
FIG. 3 is a schematic diagram of an example communication network with certain components shown in detail.

The initiating node proceeds with the partner node discovery task by sending a partner discovery broadcast message on the SCC channel over network 10. In the present example, as can be seen in FIG. 3—in particular elements 64, 66, 68 and 70, the internal schematic representations of BDAs 22, 26, 30 and 34—the transmitted discovery broadcast message will be received by all nodes downstream node 26 and only one node, node 22, upstream of node 26. There is no path for the 154.5 MHz message through node 22, so no nodes upstream node 22 would receive the partner discovery broadcast message.

Each node that receives the partner discovery broadcast message changes its communication channel to SCC (in the same way as the initiating node, described above). These nodes (in our example, nodes 22, 30, 34, 44 and 48) each send acknowledgement messages, each acknowledgement message including the unique identifier of the node sending the acknowledgement message.

The only acknowledgement message expected to reach the initiating node (in this case, BDA 26) is the one from node 22, immediately upstream node 26. No replies from any of the nodes downstream the initiating node can reach the initiating node, since there no physical or logical path that can carry their replies to the initiating node. This is because all the RF switches of the nodes that are not the initiating nodes are set to position "B," and the message is carried on SCC. Therefore, no propagation path will be available to carry to the initiating node any reply generated by nodes downstream of it—see, again, elements 66, 68 and 70 of FIG. 3. The only reply that can reach the initiating node is from the node immediately upstream the initiating node (in this example, node 22).

Once the single acknowledgement message has reached the initiating node, the initiating node knows the identity of its partner because the acknowledgement message contains the unique identifier of the partner. The initiating node then identifies its partner—the node immediately upstream from it—as its partner node to the application server 14, preferably by sending a partner node discovery output message to the server 14.

The partner node discovery method described above is repeated so that the partner is found for each of the K communication nodes. Thus, each of the K nodes will preferably be the initiating node in one iteration of the execution of the method, to identify the partner. Preferably, before each repetition, the communication settings of the nodes (DCC vs. SCC and position of RF switches) are returned to default setting. Most preferably, once a node has been the initiating node for an iteration of the partner node discovery method, it is not selected as the initiating node again during the same execution of the communication network mapping method.

In the preferred embodiment, at each node, when it is the initiating node, the output of the partner node discovery method is formulated locally as follows:

P(ID)=RNOD (ID); where ID is the ID of the initiating node (in the example above, ID=2), and P(ID) is the ID (unique identifier) of the node connected to the initiating node immediately upstream the initiating node (in the example above, P(ID)=1).

Once the nodes have all identified and reported their partner nodes, a comprehensive mapping matrix is preferably constructed at application server 14. This Network Mapping Matrix is defined by a set of ordered pairs as follows:

NMM=[n, P(n)]; where n is the ID of each communication node in the system (i.e. amplifiers and terminal nodes)—other types of nodes, such as the UPS, are preferably excluded; and P(n) is the partner ID of node n.

Characterization Method

In an embodiment of the invention, there is provided a method of characterizing the cable segments of network 10. Preferably, the method makes use of the results of the mapping method—that is, the ordered pairs representing each node and its respective partner node. It will be appreciated, however, that this characterizing method may be employed using the required information, whatever its source.

Preferably, the characterizing method is launched by the application server 14, sending messages to a specific node (first node—denoted as R-NOD, because it was, in the preferred embodiment, the receiving node in an ordered pair as described above) and the node whose partner the first node is (second node—denoted as I-NOD because it was the initiating node as described above) informing them to get ready for the network characterization. It will be appreciated, however, that the characterization method is not limited to networks that have been mapped using the mapping method described herein.

When these messages are received by the I-NOD and R-NOD, they will change their communication channels to SCC. Further the R-NOD will change the position of its RF switch to 'B' position. The I-NOD will keep the position of its RF switch at position 'A' as per default; if for some reason its RF switch is not at position 'A', it is set to position 'A'.

The I-NOD will then send a Segment Characterization Order message (SCO) to its R-NOD. At this stage, the I-NOD preferably already knows the ID of the R-NOD that is its partner; therefore, this message will be directed to that ID. The R-NOD replies with a Segment Characterization Response (SCR) message. The SCR is a repeated set of sample messages sent over all CRM (characterization reference markers, mentioned above) carriers at a predetermined transmitted signal power level.

To characterize a segment in the network, the I-NOD will receive the repeated messages (i.e., samples) from the R-NOD that is its partner. The I-NOD will measure the Received Signal Level (RSL) of these sample massages and calculate the average values of the RSL.

In executing the characterization method, each R-NOD will transmit CRM samples at a fixed rate known as the R-NOD TX Rate (RTR). The time duration for transmitting each set of CRM samples by an R-NOD will be fixed and referred to as the R-NOD TX Timeframe (RTT).

While an R-NOD is sending its SCR samples, the I-NOD will be rotating the frequency of its receiver to capture most of the SCR samples. To ensure that the I-NOD receives the maximum number of SCR samples, the R-NOD TX Timeframe (RTT) must be at least twice long as the I-NOD RX Timeframe (IRT). The RTT and IRT parameters are defined in the constant table.

Figure 4:
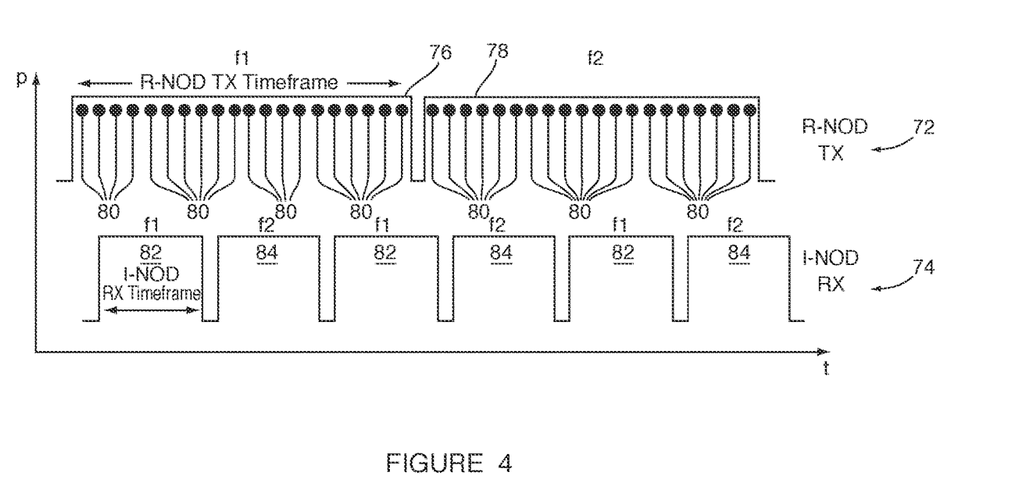
FIG. 4 is a graph showing Tx and Rx timing for example network mapping.

FIG. 4 illustrates the timing of the sending by the R-NOD and the receiving by the I-NOD of the SCR. The timing of the sending of the SCR is generally shown in graph 72, and the receiving in graph 74. In FIG. 4, transmitted signal power is shown on the vertical axis and time on the horizontal axis. As can be seen in FIG. 4, the RTT is more than twice as long as the IRT. The envelopes of the SCRs being sent are denoted by reference numerals 76 (SCR at f1) and 78 (SCR at f2). The CRMs (characterization reference markers) that make up the SCRs are denoted by reference numeral 80. Meanwhile, the f1 receiving periods are denoted by reference numeral 82, and the f2 periods by 84.

As shown in FIG. 4, the R-NOD rotates the frequency of the SCRs and the I-NOD rotates the frequency of reception as described above. In the present example, there are two operating frequency bands, including respectively the frequencies f1 and f2, in the network. However, in some networks 10, there may be only one operating frequency, in which case there would be no rotation. There may be more than two operating frequencies or frequency bands, in which case the sending and receiving would preferably rotate through those frequencies as described above.

In the example shown in FIG. 4, the R-NOD begins by sending the first set of SCR samples over the f1 carrier followed by the same number of SCR samples being sent over the f2 carrier. During any characterization session, one or more SCR messages might be lost, for example, due to noise. However, preferably, averaging is used to compensate for the missing samples. Furthermore, if the I-NOD does not obtain enough samples (for example, more than 50% of the samples are lost), the I-NOD will issue a retry to the R-NOD until adequate samples are received. The I-NOD will try that approach for a predetermined number of times (for example, 3 retries) before reporting a time-out and then moving on to characterizing the next segment.

The I-NOD will measure the Received Signal Level (RSL) for all the received messages from the R-NOD. It will then calculate the Average RSL Matrix of these samples for all the CRM carrier frequencies as follows:

$$RSL(f_b) = \text{Average RSL}[SCR(f_b)]$$

Because, in the preferred embodiment, there is only one CRM in each band, the equation can be written with reference to the identifier of the band, as follows:

$$RSL(b) = \text{Average RSL}[SCR(b)] \quad \text{(Equation 1)}$$

RSL(b) is the Average RSL Matrix for all the CRM carriers in the system. "Average" means a moving window average of all received SCR for all $f_b$; b is the Band Reference Number (b={1, 2, 3 ... B}); is the total number of bands in the system (in this example, B=2); and $f_b$ is the Band Marker Frequency in MHz (in this example, $f_1$=150 MHz and $f_2$=174.80 MHz—see FIG. 2).

It can now be seen how the individual Segment Loss (SL) for each cable segment in the network may be calculated. SL has two components: The Cable Longitudinal Loss (LL) and the Passive Flat Response Loss (FL). The Cable Longitudinal Loss, LL, is the loss in dB of the cable in the segment. LL is a function of the cable Length, L, and the frequency of propagation f. The FL, on the other hand, is the total loss in dB of all the passive devices in the particular segment. It is not a function of frequency (i.e. FL has flat RF response). SL can be calculated for any cable segment, n, as follows:

$$SL(b) = LL(b) + FL \quad \text{(Equation 2)}$$

SL (b) is the total Segment Loss, in dB, for segment n at frequency $f_b$; LL (b) is the cable Longitudinal Loss, in dB, in segment n at frequency $f_b$; and FL is the Passive Flat Response Loss of all the passive devices included in segment n—FL has flat frequency response and, therefore, is not a function of the frequency.

The cable Longitudinal Loss for any cable segment, n, can be calculated using the formula:

$$LL(b) = (k(f_b) \cdot L)/100 \quad \text{(Equation 3)}$$

L is the length of the cable segment in metres. $k(f_b)$ is the Cable Longitudinal Loss Coefficient at $f_b$. This coefficient is measured in dB/length of cable (typically dB/100 m). This value is a characteristic of the cable and can be obtained from the cable data sheets. Preferably, this coefficient is stored in the constants table for all segments of cable in the network 10.

Substituting Equation 3 into Equation 2 yields:

$$SL(b)=(k(f_b)*L)/100+FL \quad \text{(Equation 4)}$$

The Average RSL Matrix, RSL(b) is obtained using Equation 1. Using RSL(b), segment loss SL can also be calculated as $$SL(b)=MP-RSL(b) \quad \text{(Equation 5)}$$

MP is the transmit power level of the CRMs, in dBm. Preferably, all reference markers have the same predetermined transmit power level, and that power level is preferably stored in the constants table.

The following two equations thus describe the SL at each of the bands in the system:

$$SL(b_1)=MP-RSL(b_1) \quad \text{(Equation 6)}$$

$$SL(b_2)=MP-RSL(b_2) \quad \text{(Equation 7)}$$

Using Equation 4, the following two equations can also be formulated:

$$SL(b_1)=(k(f_1)*L)/100+FL \quad \text{(Equation 8)}$$

$$SL(b_2)=(k(f_2)*L)/100+FL \quad \text{(Equation 9)}$$

The cable coefficients $k(f_1)$ and $k(f_2)$ are stored in the constants table. Thus, having this information, L and FL can be determined using Equations 8 and 9. Using Equation 8 we find:

$$FL=SL(b_1)-(k(f_1)*L)/100$$

Substituting this equation into Equation 9, the length of the segment can be determined as follows:

$$SL(b_2)=(k(f_2)*L)/100+SL(b_1)-(k(f_1)*L)/100 \quad \text{(Equation 10)}$$

Therefore:

$$L=[(SL(b_2)-SL(b_1))/(k(f_2)-k(f_1))]*100 \quad \text{(Equation 11)}$$

All of these parameters, needed to calculate L, are constants or have been ascertained as described above. Thus, once L is calculated, it can be used to calculate the longitudinal loss LL(b) for each band according to Equation 3, as possible:

$$LL(b)=(k(f_b)*L)/100$$

Also, the value of L can be substituted into equation 10 to find the value of FL:

$$FL=SL(b_1)-(k(f_1)*L)/100$$

Figure 8:
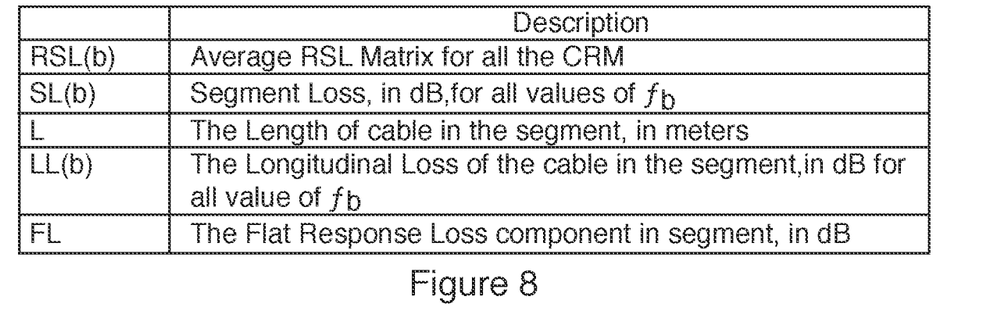
FIG. 8 shows an example Local Characterization Parameters message.

Once this method has been executed to characterize a particular cable segment, it is preferably the I-NOD that will compile all of the characterization parameters and send them to the application server 14 in the form of a Local Characterization Parameters message. See, for example, FIG. 8. The Local Characterization Parameters preferably comprise:

RSL(b)=Average RSL[SCR(b)]—this is the average RSL matrix for all of the CRM carrier frequencies in the system as received by the I-NOD;

SL(b)—the segment loss in dB for all values of $f_b$;

L—the length of the cable segment, in metres;

LL(b)—the Longitudinal Loss of the cable in the segment, in dB, for each value of $f_b$;

FL—the Flat Response Loss component in the segment, in dB.

Figure 9:
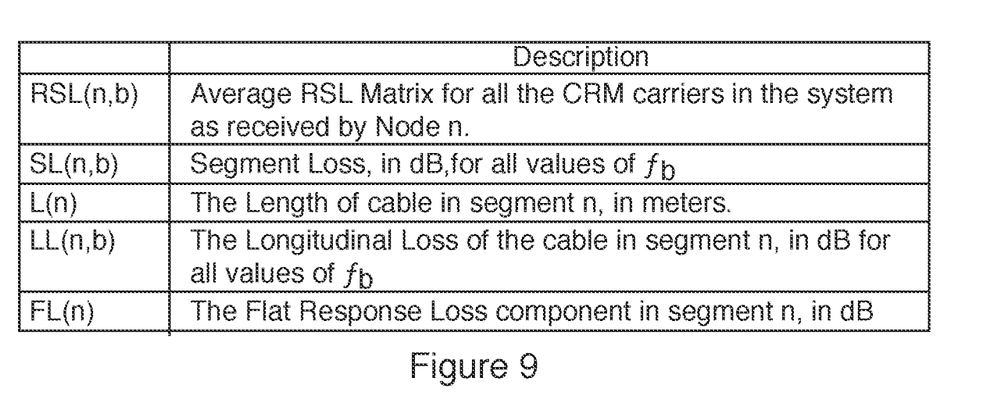
FIG. 9 shows an example Global Characterization Parameters table.

In the preferred embodiment, the application server also stores in associated memory Global Characterization Parameters for the network 10 as a whole (for example, as shown in FIG. 9), formulated as follows:

RSL(n,b)—Average RSL [SCR (b)], the Average RSL Matrix for all the CRM carriers in the system as received by Node n;

SL (n,b)—Segment Loss, in dB for all values of $f_b$;

L(n)—the length of cable segment n, in metres;

LL(n,b)—the Longitudinal Loss of the cable in segment n, in dB, for all values of $f_b$; and FL(n)—The Flat Response Loss component in segment n, in dB.

Localization System and Method

Localization systems (also known as Tagging systems) in mining and tunnelling operations are used to locate people or assets in mines and tunnels. Typically, these applications are used to enhance the safety and productivity of the mines. The whereabouts of people or machinery labelled with an electronic tag can be captured and reported to centralized application servers and databases located at the mines' control centers.

In the localization method, information previously known or obtained about the leaky cable segments of network 10 can be used to calculate an estimated distance between location tags and tag readers. Thus, this method and system can be used to report locations of tags continuously and in real time. By contrast, prior art systems are based on Last Known Location or Zonal concepts, which can only locate a tag within the zone of a tag reader, and cannot locate the tag once it leaves that zone, unless it enters another zone. In this description, the terms "location tag" or "tag" refer to a beacon emitting a signal, typically electromagnetic, used in the estimation of the location of the tag.

Preferably, the localization method makes use of the outputs of the mapping and characterization methods described above, though it will be appreciated that the localization method may operate without those outputs or independently of the execution of those methods.

Figure 5:
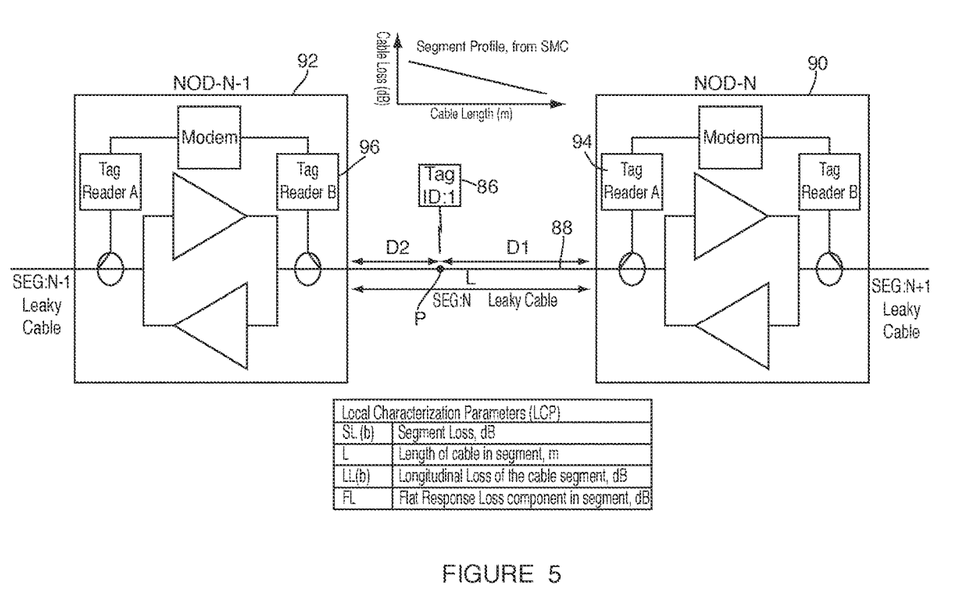
FIG. 5 is a detailed schematic view of a portion of an example network as used for tag location.

Referring to FIG. 5, in the preferred embodiment, the localization tag 86 is continuously transmitting messages containing its ID (in this example, the ID is "1"). When the tag is present in areas where leaky cable network is installed, such as cable segment 88, the tag's message can be received by the nodes 90 and 92 at opposite ends of the segment 88. Specifically, the message from the tag 86 travels to point P on segment 88, and then travels along segment 88 to nodes 90 and 92. The distance along segment 88 to node 90 from point P is shown as D1. The distance along segment 88 to node 92 from point P is shown as D2.

As described below, in this method leaky cable is used to receive signals from location tags and in the estimation of the position of the location tags relative to tag readers. Apart from the details of the preferred method described herein, it is believed that the use of leaky cable in this manner is not previously known.

In the preferred embodiment, the messages from the tag cannot travel past the nodes 90 and 92 positioned at the ends of segment 88. For example, if the tag is transmitting its message over 433 MHz (in the ISM band), and the BDAs operate in VHF band, then the tag frequency will only be read by the tag readers of the nodes 90, 92 immediately connected to that leaky cable segment 88, but not others. In the preferred embodiment, the tag readers at the nodes are distinct from the communication modems at those nodes (which are described above), and the tag signal enters the tag reader from a separate port from those used for ordinary communication or for the mapping and characterization methods.

The signal from tag 86 containing its ID travels to point P on segment 88. The signal then travels distance D1 and is received at tag reader 94 of node 90. The signal also travels distance D2 and is received at tag reader 96 of node 92. The received signal level is measured at both tag readers. In the discussion below, the received signal level at tag reader 94 will be called RSL1, and at tag reader 96, RSL2.

The messages from the tag 86 also preferably contain a sequence ID, to ensure that the two tag readers are measuring the RSL for the same message. The system preferably compares RSL1 and RSL2 for the same message to facilitate localization.

If $\Delta$ is defined as ABS(RSL2)−ABS(RSL1), then the preferred Scaling Normalization Factor "F" can be calculated as follows:

$F = ABS[0.50*[(\Delta - \Delta_{max})/(\Delta_{min} - \Delta_{max})]]$, where $\Delta$ is the instantaneous difference between RSL1 and RSL2, in dBm; Amin is the minimum RSL difference that can be expected for each cable segment, measured in dBm; and $\Delta_{max}$ is the maximum RSL difference that can be expected for each cable segment, measured in dBm.

At exactly mid point of the segment when D1=D2, $\Delta_{min}$ is expected to be 0 dB. Therefore, the Scaling Normalization Factor "F" can further be defined as $F = ABS[0.50*[(\Delta - \Delta_{max})/(-\Delta_{max})]]$, with boundary condition $\Delta_{max} \neq 0$.

Once factor F has been calculated, the approximate distances of the tag from node 90 and node 92 can be calculated as follows:

$$D1 = L*F$$

It will be appreciated that the length L is previously known, preferably from the execution of the characterization method described above. Once D1 is calculated as shown above, D2 can be calculated as follows:

$$D2 = L - D1$$

Knowing the location of nodes 90 and 92, and of segment 88, once D1 and/or D2 are determined, the location of point P can be determined. Point P is the estimated location of tag 86.

It will be appreciated that, in confined areas such as mines, the simple use of RSL to calculate distance (which is not how the present invention operates) might create a problem. Specifically, in a confined area such as a mine, with the tag signal coming in from off of the network 10, there can potentially be a multipath problem resulting from, inter alia, the tag signal reflecting off of various points in the mine tunnel and arriving at different points of the cable segments.

However, the present invention mitigates this potential problem by not directly using RSL to calculate or estimate distance. Rather, the present invention uses the differential RSL of the same message as it is received by two different tag readers. As a result, it is expected that errors due to randomized or probabilistic elements in RF link calculation—such as cable coupling loss and other multipath elements—cancel each other out when comparing RSLs of the same message.

Figure 6:
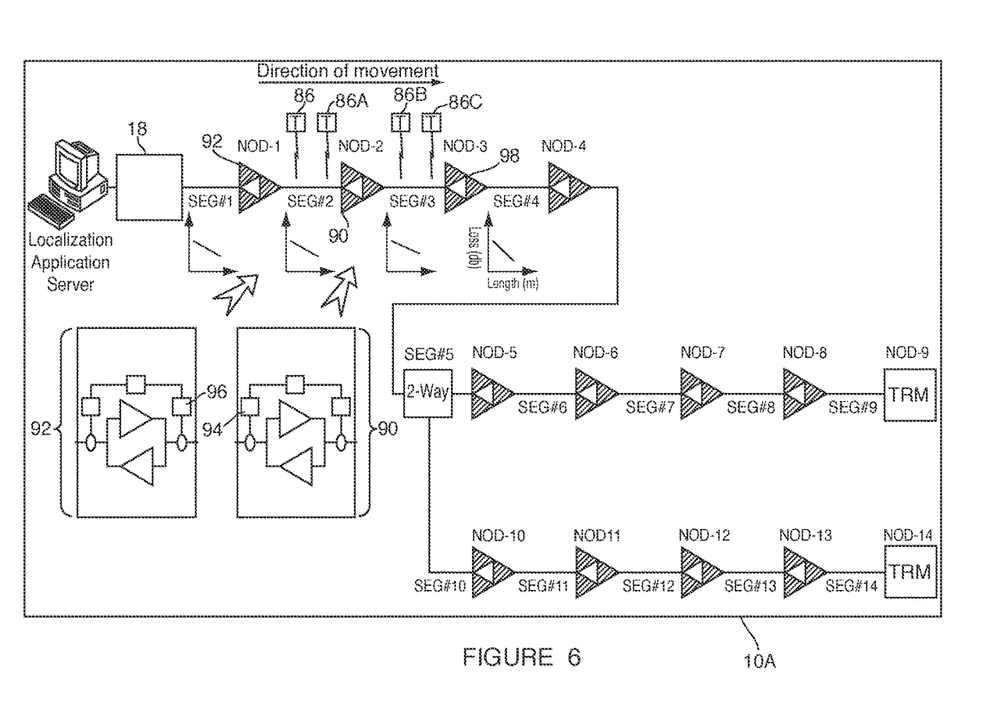
FIG. 6 is a detailed schematic view of an example communication network illustrating a location tag in motion.

It will be appreciated that tags 86 can report their location while in motion in the mine, generally as long as they are sufficiently close and in line-of-sight to the leaky cable, as shown in FIG. 6. In FIG. 6, an example network 10A is shown with somewhat different architecture than network 10. Tag 86 is shown in motion to positions 86A, 86B and 86C. At positions 86B and 86C, the signal from the tag is received downstream of node 90, at SEG #3 between nodes 90 and 98, rather than at the segment between nodes 90 and 92. The same characterization and mapping parameters for SEG #3, preferably determined via the relevant methods described above, are used to locate the tag even as it moves to a different portion of the network.

While the foregoing preferred embodiments of the present invention have been set forth in considerable detail for the purpose of making a complete disclosure of the invention, it will be apparent to those skilled in the art that other embodiments described herein are comprehended by the broad scope of the invention as defined in the appended claims.

The invention claimed is:

1. A method of estimating a location of a location tag using a network, the network comprising a plurality of leaky cable segments, each segment having a first node at a first segment end and a second node at a second segment end, the method comprising the steps of:
    (A) receiving, on a particular leaky cable segment, a tag signal comprising a tag message transmitted from a location tag;
    (B) after the tag signal travels to the first node and second node of the particular leaky cable segment, measuring the received first node tag signal level and the received second node tag signal level;
    (C) using a previously known length of the particular leaky cable segment and a difference between the received first node tag signal level and the received second node tag signal level, determining a point on the particular leaky cable segment at which the tag signal was received;
    (D) using a previously known location of the particular leaky cable segment, determining a location of the point on the particular leaky cable segment at which the tag signal was received; and
    (E) estimating a position of the location tag in association with the processing of steps (A) through (D).

2. A method as claimed in claim 1, wherein step (C) comprises determining a first distance of the point from the first node.

3. A method as claimed in claim 2, wherein the method further comprises determining a second distance of the point from the second node.

4. A method as claimed in claim 2, wherein the first distance is determined by multiplying the length by a scaling normalization factor.

5. A method as claimed in claim 4, wherein the scaling normalization factor is determined according to the following formula:

$$F = |[(0.5)(\Delta_{max} - \Delta)]/[-\Delta_{max}]|$$

where F is the scaling normalization factor; $\Delta$ is an instantaneous difference between the received first node tag signal level and the received second node tag signal level; and $\Delta_{max}$ is a maximum received signal level difference expected for the particular leaky cable segment.

6. A method as claimed in claim 5, wherein the method comprises determining a second distance of the point from the second node by subtracting the first distance from the length.

7. A method as claimed in claim 1, further comprising using at least one leaky cable segment for estimating a location of the location tag by receiving location signals from the location tag.

8. A method as claimed in claim 7, further comprising using the leaky cable in estimating a position of the location tag relative to at least one communication node of a communication network.

9. A method as claimed in claim 7, the use further comprising using a previously-known length of the leaky cable segment as a reference element in estimating the distance of and location of the location tag.

* * * * *